United States Patent [19]

Mouille

[11] 4,104,003
[45] Aug. 1, 1978

[54] ROTOR ARRANGEMENT FOR ROTARY WING AIRCRAFT

[75] Inventor: René Louis Mouille, Aix en Provence, France

[73] Assignee: Societe Anonyme dite Societe Nationale Industrielle Aerospatiale, Paris, France

[21] Appl. No.: 686,638

[22] Filed: May 14, 1976

[30] Foreign Application Priority Data

May 14, 1975 [FR] France .................. 75 14987

[51] Int. Cl.² .................................. B64C 27/38
[52] U.S. Cl. .............................. 416/141; 416/134 A; 416/148
[58] Field of Search ............. 416/102, 148, 138, 141, 416/134 A, 214 R, 138 A, 140 A

[56] References Cited

U.S. PATENT DOCUMENTS

| 2,830,669 | 4/1958 | Klockner ............... 416/141 X |
| 2,949,967 | 8/1960 | Jovanovich ............ 416/134 A |
| 3,193,019 | 7/1965 | Drees et al. ............ 416/141 X |
| 3,231,222 | 1/1966 | Scheutzow ............. 416/134 A X |
| 3,484,174 | 12/1969 | McCoubrey ............. 416/138 X |
| 3,669,566 | 6/1972 | Bourquardez et al. ..... 416/141 X |
| 3,762,834 | 10/1973 | Bourquardez et al. ..... 416/134 A |
| 3,880,551 | 4/1975 | Kisovec ............... 416/141 X |
| 3,942,910 | 3/1976 | Snyder et al. ......... 416/141 |
| 3,967,918 | 7/1976 | Mouille et al. ........ 416/138 X |

FOREIGN PATENT DOCUMENTS 1,190,259  4/1970  United Kingdom ............. 416/134 A Primary Examiner—Everette A. Powell, Jr.
Attorney, Agent, or Firm—William D. Stokes

[57] ABSTRACT

The present invention relates to a rotor arrangement for rotary-wing aircraft, comprising at least one pair of opposite blades mounted on a common one-piece beam, which is twistable, flexible and whose median part rotates with the shaft of the rotor.

According to the invention, this arrangement is characterized in that said beam is mounted on the shaft of the rotor by means of an articulation enabling it to pivot, in limited manner, about an axis transverse to said beam and at right angles to said rotor shaft.

The invention is applied to rotors for helicopters.

6 Claims, 4 Drawing Figures

ROTOR ARRANGEMENT FOR ROTARY WING AIRCRAFT

The present invention relates to a rotor arrangement for a rotary wing aircraft, more particularly a rotor head of the so-called "balanced" type, allowing the rotor to tilt with respect to a drive shaft. "Balanced" rotor is understood to mean a rotor comprising at least one pair of opposite blades, the two blades of one pair being articulated so as to flap about a common articulation.

Several types of "balanced" rotors are already known, among which may be mentioned embodiments comprising control blades and lift blades mounted to articulate on a hub. To this end, the rotor shaft or mast terminates in a yoke for receiving a Universal joint cross-pin, pivotally mounted in internal bearings of the hub, substantially in the form of an ellipse or square. In certain of these embodiments, the hub equipped with journals for receiving bushes carrying lift blades has on its inside cavities for housing the end of the prongs of the fork then acting as flap stops.

In a similar construction, using a Universal joint support, a control system with plate connected to the incidence changing levers on the one hand and to the journals of Universal joint cross-pins on the other hand, allows an automatic periodic variation of the angle of attack of the blades and a reduction of their movements of conicity.

In the above-mentioned embodiments, the vertical flap and the cyclic variations of the pitch are obtained by means of a Universal joint system. In translation, considerable alternate stresses, which are harmful to the hub appear, in the control blades, due to the fact that the plane of the rotor and the control plane no longer coincide. To reduce the importance of these stresses, the Universal joint type articulation has been offset above the hub.

In an embodiment of such a rotor, the rotation of the Universal joint support by the rotor shaft is effected by a splined connection. The body of the hub swivels on the axles of the cross-pin and bears at its base droop plates on which are attached the blades, by means of the bushes for varying incidence.

In these "balanced" rotors, the two opposite blades are generally fixed rigidly with respect to each other and are subjected at their root to considerable bending moments. Moreover, their production is complicated and generally requires rolling devices for the articulation of incidence, which must be carefully lubricated to avoid deterioration in service due to strong centrifugal loads coming from the blades and pulling on this articulation. Moreover, said latter is subjected to movements of oscillation bringing about the "brinelling" of the roller bearings.

To avoid drawbacks of these balanced rotors provided with an articulation of incidence, mechanically simplified embodiments have already been proposed in which the connection of the blades with the hub calls upon a torsionally deformable element. To this end, the rotor comprises at least one beam, in one piece, carrying two opposite blades. This beam is fixed to the end of a rotor mast, by means of two lower and upper plates provided with a groove for receiving said beam in association with intermediate parts. Each blade is traversed longitudinally by the corresponding portion of beam and is rendered integral therewith. This beam is made of a flexible and twistable material, having a very high modulus of elasticity. In fact, the flapping of the wing depends on its flexibility, whilst the control of incidence of the blades being effected by twisting of said beam, said latter must be twistable.

However, in these embodiments where there is a beam in one piece, it has been noted that, in flight, excessive dynamic flap stresses appeared in this latter. To remedy this, it has already been thought to reinforce the beam. However, such a reinforcement leads to stiffen it in torsion, this being known to increase the forces of control of incidence of the blades, and requires the positioning of servo-controls, which are expensive and delicate members.

It is an object of the invention to remedy these various disadvantages of the known rotor arrangements and to avoid the necessary compromise concerning the flexibility of the one-piece beam, said compromise being due to the fact that this beam must simultaneously ensure the functions of flap and of incidene of the blades of the wing.

To this end, the rotor arrangement for rotary-wing aircraft, according to the invention, comprising at least one pair of opposite blades, mounted on a common, one-piece beam, which is twistable, flexible and whose median part rotates with the shaft of the rotor, is noteworthy in that said beam is mounted on the shaft of the rotor by means of an articulation enabling it to pivot, in limited manner, about an axis transverse to the beam and at right angles to said rotor shaft.

In an advantageous embodiment, the end of the shaft of the rotor is extended by a fork between the prongs of which is mounted a plate pivotable about an axis at right angles to the said shaft and arranged to recieve the median part of said beam. To this end, this plate may comprise a recess transverse to its pivot axis, of form corresponding to the section of said beam, said recess serving as housing for the median part of this latter, which is enclosed therein by a cap. The plate is preferably mounted on the prongs of said fork by means of self-lubrificating bearings.

In the case of each blade constituted by a sectioned envelope surrounding the corresponding half of the beam and shaped, on the rotor shaft side, as a blade root, which case is known, it is advantageous if, on the blade root side, the plate and the cap are shaped as supports for said blade roots. The blade root supports are preferably constituted by self-lubricating bearings with spherical internal bearing surface allowing movements of conicity and of flap of low angular values, as well as a slight axial displacement of the blade.

To this end, the root of each blade may be made fast with a collar on which is fixed a ring-shaped member provided, on the side opposite the corresponding blade, with a flange surrounding a spherical portion of surface formed in said plate and cap, a ring made of self-lubricating material being arranged between said flange and said spherical surface portion.

Each support is advantageously terminated, on the rotor shaft side, by an annular edge, whilst the outer face of said flange of the ring-shaped member is provided with a peripheral channel and an annular lip seal is disposed between said edge and said channel, in order to protect the support from any outside aggression.

To permit the variation of the incidence of the blades by torsion of said beam, each ring-shaped member may comprise a cut-out portion allowing a blade pitch-changing lever to be fixed on the blade root collar.

The essential advantage of the assembly of the balanced rotor at the end of the rotor mast, in accordance with the invention, is to reduce the deformations of flap of the flexible blade consituting the beam and consequently the dynamic stresses which said blade undergoes during forward flight. In fact, in this case of flight, the rotor tilts about the axis of the balance beam so that the blade is subjected only to low-amplitude movements of flap which produce only reduced dynamic bending moments.

Such an assembly reducing the flapping movements of the blades and movements in conicity to very low angular values, allows a very simple support of the blade root on the hub, at the level where the blade is fitted on the body of the hub.

The rotor arrangement according to the invention is very advantageous by its simplicity of production and its low cost price, due in particular to a considerable reduction of the members included in its constitution.

The invention will be more readily understood on reading the following description with reference to the accompanying drawings, in which.

Figure 3:
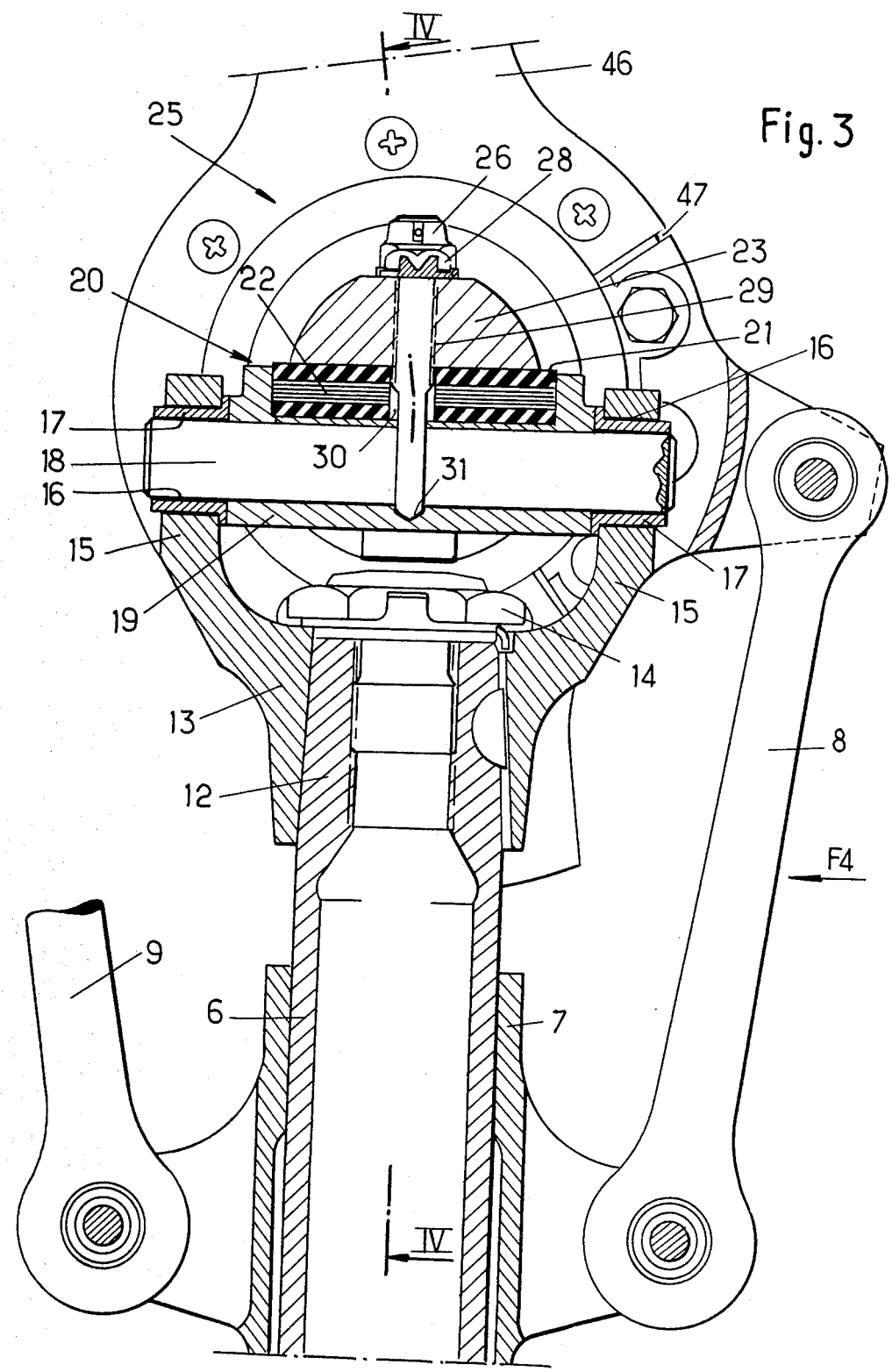
FIG. 3 is a view in axial section, along line III—III of FIG. 2.
Figure 4:
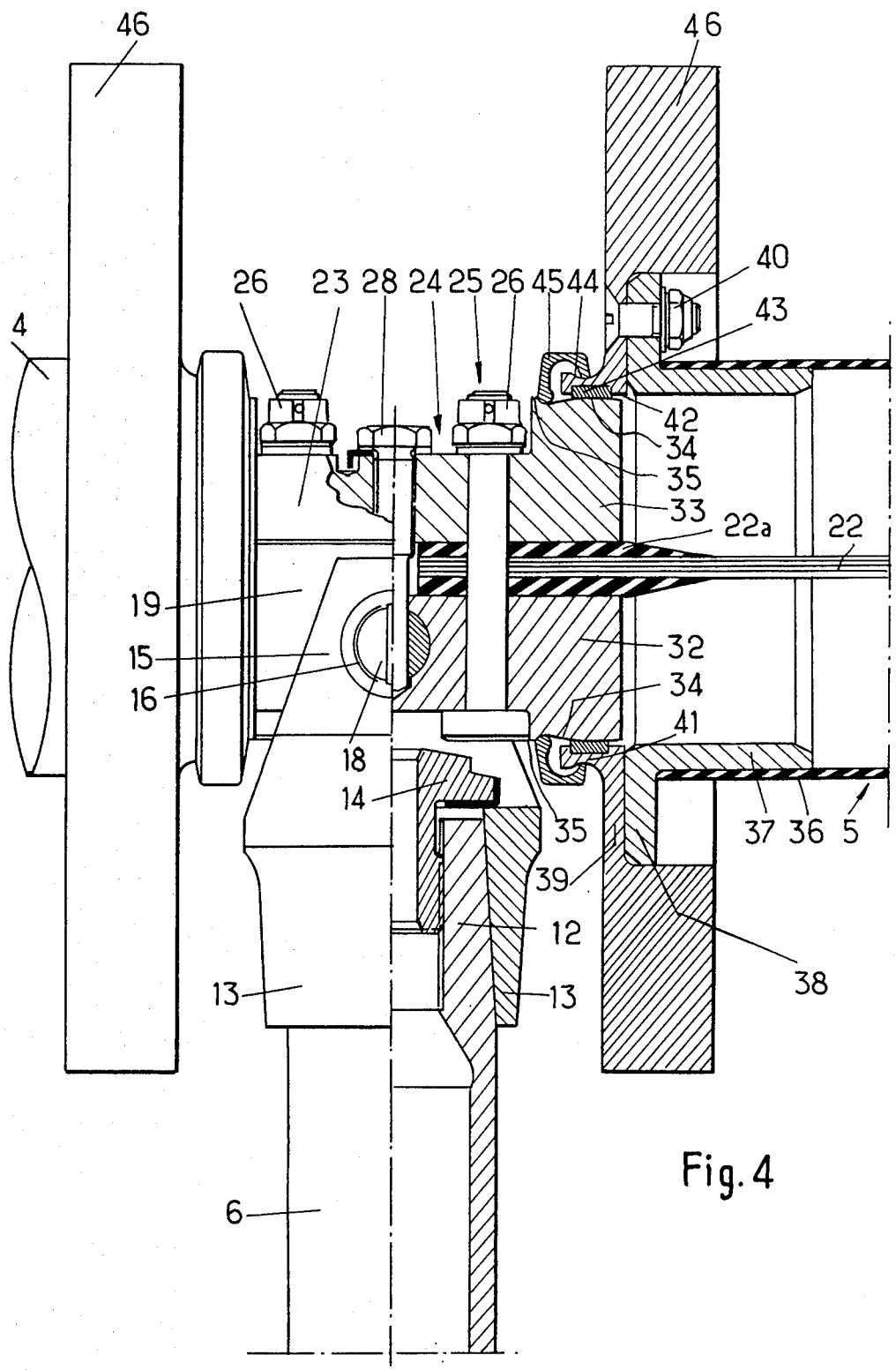

FIG. 4 corresponds, for one half, to a side view in the direction of arrow F4 of FIG. 3 and, for the other half, to a section along line IV—IV of this latter Figure. In FIG. 4, the system of rods for controlling the blade pitch has been assumed to have been removed.

In the embodiment illustrated in FIGS. 1 to 4, concerning more especially a helicopter anti-torque rotor, the end of the tail boom 1 is provided with an anti-torque rotor 2 rotated by a mechanism 3. This rotor 2 comprises a pair of opposite blades 4 and 5 mounted on the shaft 6 of the rotor. On this latter is mounted a sliding bush 7 which, by means of rods 8 and 9, enables the pitch of the blades 4 and 5 to be controlled.

Figure 1:
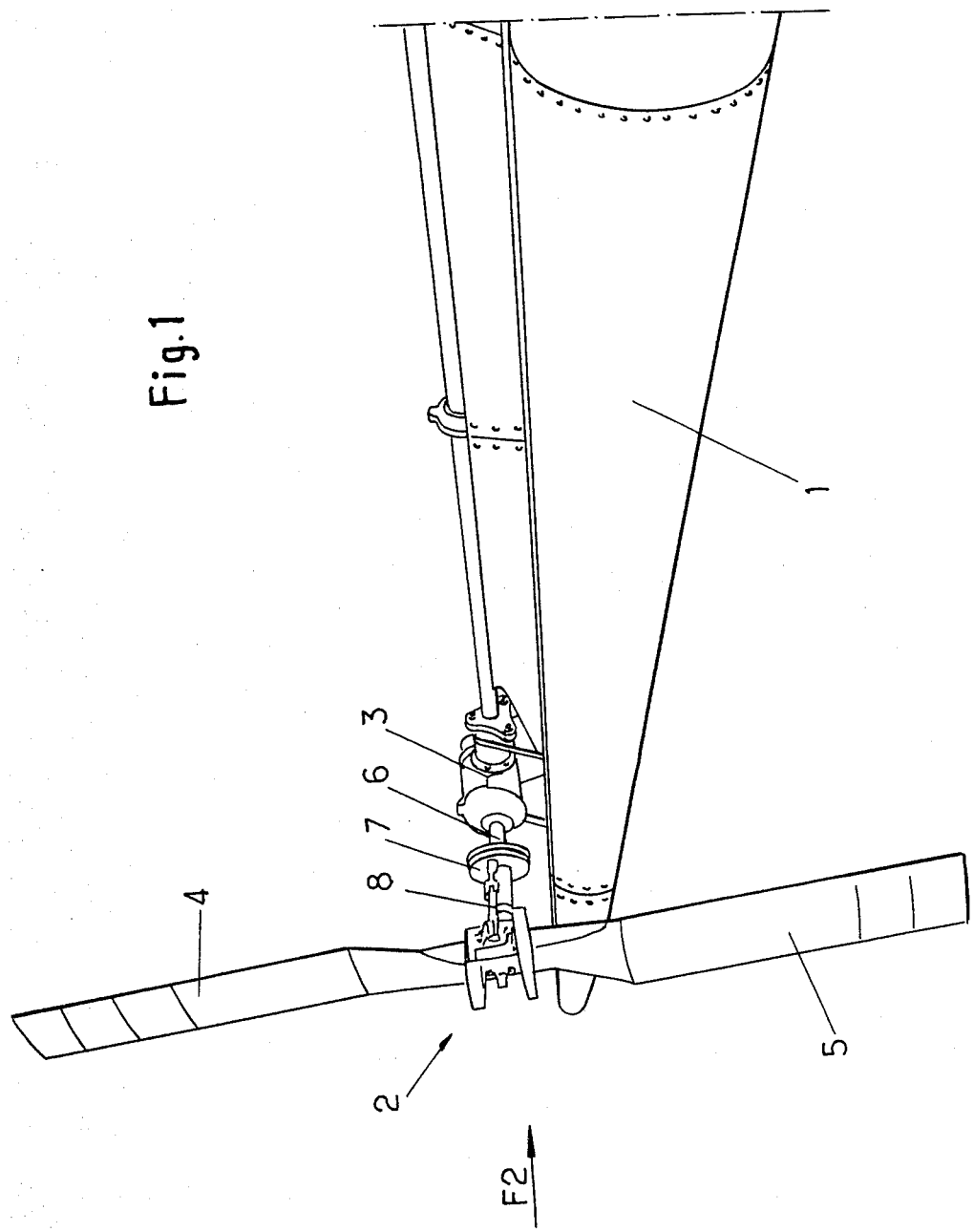
FIG. 1 is a part perspective view of a helicopter equipped with a rotary wing in accordance with the invention.
Figure 2:
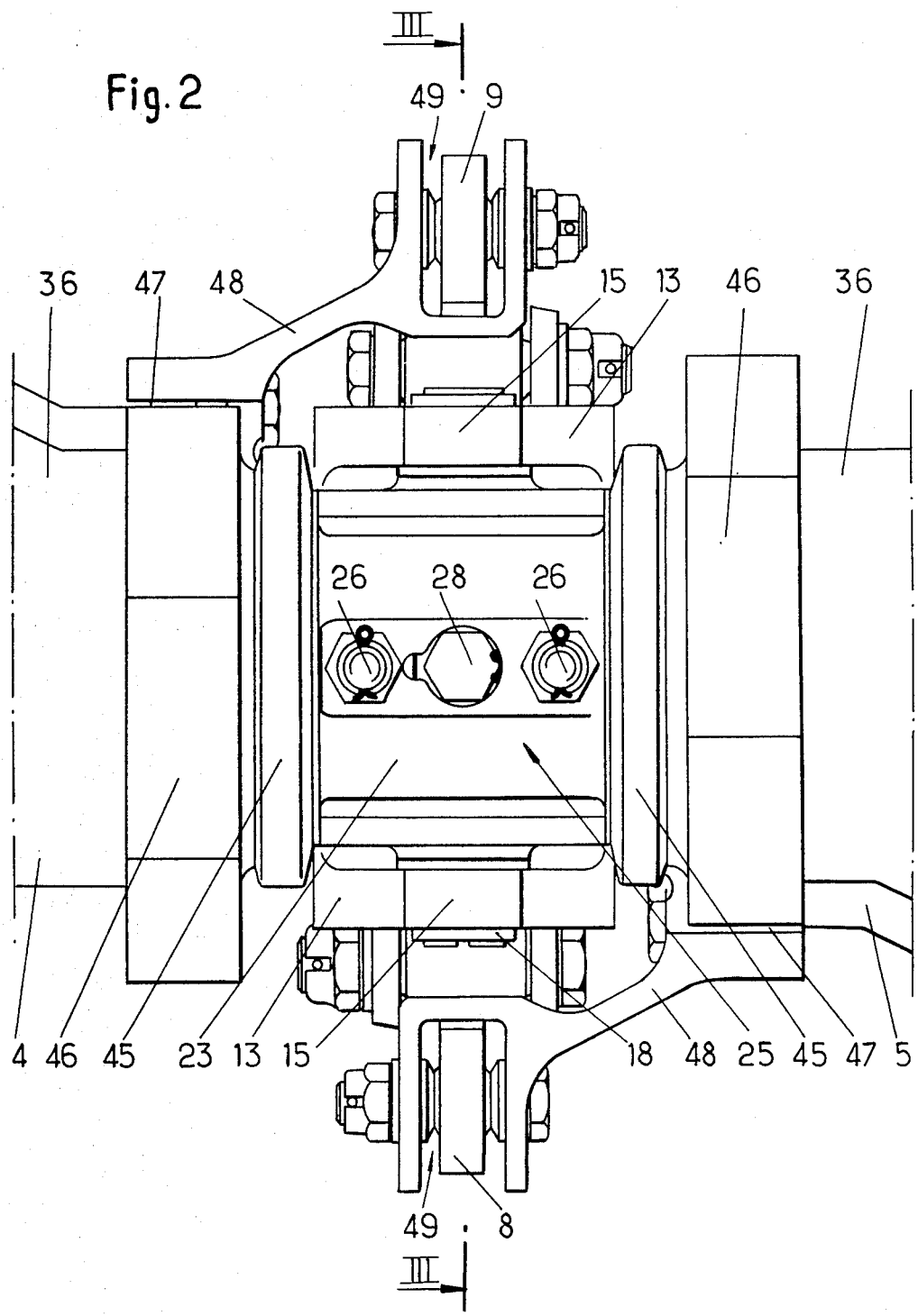
FIG. 2 is a part side view in the direction of arrow F2 of FIG. 1, of the anti-torque rotor of this helicopter.

FIGS. 2, 3 and 4 show in greater detail the structure of the two-bladed rotor 2 and its assembly on the shaft 6.

As shown in these Figures, the shaft 6 of rotor 2 is hollow and its upper end 12 is frusto-conical in form on which is fitted a member 13 which comprises two arms 15 forming a fork and which is held in place by a stop bolt 14. In each arm 15 of the fork is arranged a bore 16 and the axes of the bores 16 thus constituted are concordant and define a direction at right angles to the shaft 6. A shaft 18 serving as pivot for a plate 19 constituting a hub plate is engaged in these bores 16 by means of self-lubricating sockets 17. The upper face 20 of this plate has a recess 21, of rectangular section and transverse to the axis 18. This recess 21 defines a housing for the one-piece beam 22 for the two opposite blades 4 and 5.

This twistable and flexible beam 22 of known type is of flattened rectangular section and is made of highly resistant fibres of relatively low modulus of elasticity, coated with heat-hardened synthetic resin, in order to form a blade which extends over the whole span of the rotor 2. The housing 21 containing the central portion of the blade 22 is closed, by abutment on its lateral walls, with the aid of a cap 23 having the form of a half-cylinder, which offers a central hollowed-out part 24 on its periphery. In its median part, enclosed in device 19, 23, the beam 22 may comprise reinforcements 22a.

The plate 19 and the cap 23 tightening the central portion of the beam 22 and constituting a rotor hub having the general reference 25, are held in place by the through-bolt 26. The pivot shaft 18 of the plate is made fast with the hub 25 by means of a central bolt 28 engaged in respective bores 29, 30 made in the cap 23 and the beam 22, and in a blind hole 31 in the bottom of the plate.

Each of the side parts such as 32 of the plate and such as 33 of the cap are shaped on their periphery as spherical portions 34 terminating towards the centre of the rotor by an annular edge 35.

On the beam 22 and at each of its ends (not shown) are fitted claddings constituted by two shells forming, in known manner, with said beam the two blades 4 and 5 of the rotor 2. These two shells are integrated with the beam over a certain length near its ends, leaving it free on the side of its roots to allow a slight flapping of blades by flexion of the beam 22 and their pitch variation, by its torsion.

The shape of the cross-section of the root of each blade, partially shown in FIGS. 2 and 4, develope progressively towards the centre of the rotor, from the section of the blade itself in order finally to form, in known manner, a cylindrical bush of revolution 36. This portion of blade root in the form of bush covers a collar 37, also in cylindrical form, with which it is fast, which collar comprises a circular rigidifying shoulder 38.

A member 39 in the form of a ring is connected by bolt 40 to the shoulder of the collar 39 and comprises a flange 41 opposite said latter. In the face 42 of this flange 41, directed towards parts 32, 33 of the rotor hub 25, is made a groove which houses a ring 43 made of self-lubricating material intended to ensure contact with the spherical portion 34 of each respective end 32, 33 of said hub 25. This ring constitutes a point of abutment for the blade root circular collar 37, thus for the blade, which enables it to oscillate on said spherical portion. It also allows a slight reciprocal axial displacement, caused by elongation of the beam 22, under the effect of the centrifugal force.

On the outer concave face of the flange 41 is housed the lip of an annular seal 45 whose other lip abuts against the edge 35, said seal intended to avoid the introduction of undesirable material at the level of the point of abutment of the blade roots.

Each of the members 39 may comprise, on either side of a plane perpendicular to the axis of the rotor and substantially in the direction of said axis, balancing masses such as 46 which are opposite and identical, intended to reduce the return of the blades to flatness and consequently the control force of the rotor.

Each of the two members 39 also offers a cut-out portion such as 47 allowing a lever 48 for varying the pitch of the blades to be attached to the collar 37. This lever is arranged so that its articulation 49 to the corresponding pitch control rod 8 and 9, is located on the articulation axle 18 of the plate 19, thus enabling a flap-pitch "connection" of zero value to be obtained in the case of the rod 8, 9 for controlling the pitch of the blade 4, 5 being located on the trailing edge side of said latter.

In the embodiment described hereinabove, the invention has been applied to the anti-torque rotor 2. It is obvious that the lift rotor may also be given a similar structure according to the invention.

What we claim is:

1. A rotor head assembly for rotary wing aircraft, comprising: a rotor hub having a two pronged fork; a pair of blades disposed on opposite sides of said hub; a one-piece, flexible, twistable beam connecting said blades; a shaft means rotatably mounted between the prongs of said fork and extending transversely to the longitudinal axis of said blades and intersecting the axis of rotation of said rotor hub, said shaft means having a mounting plate disposed between said prongs and arranged to receive the median part of said beam, said mounting plate having a recess disposed transversely to said shaft means, said recess housing said median part of said beam; cap means enclosing said median part within said recess; said beam being pivotably mounted for pivoting about the axis of rotation of said shaft means.

2. Apparatus according to claim 1 wherein each of said blades comprises a sectioned envelope surrounding the corresponding part of said beam, said envelope shaped, on the rotor hub side, as a blade root; and wherein said mounting plate and said cap means are shaped for providing supports for each of said blade roots.

3. Apparatus according to claim 2 wherein each said blade root support includes a spherical bearing surface with curvature terminating towards the center of said hub; said apparatus further including: collar means secured at the end of each blade root; said collar means including a flange surrounding said spherical bearing surface; and a ring made of self-lubricating material interposed between said flange and said bearing surface.

4. Apparatus according to claim 3 and further including a ring-shaped balance member secured to each of said collar means.

5. Apparatus according to claim 3 wherein each said blade root support is terminated on the rotor shaft side by an annular edge, and wherein said flange includes a peripheral channel; said apparatus further including an annular lip seal disposed between said annular edge and said peripheral channel.

6. Apparatus according to claim 4 wherein each said ring-shaped balance member comprises a cut-out portion for allowing a lever for changing the pitch of the blades to be fixed on said collar means.

* * * * *